(12) United States Patent
Jeong et al.

(10) Patent No.: US 11,499,630 B1
(45) Date of Patent: Nov. 15, 2022

(54) APPARATUS FOR CONTROLLING SHIFT OF VEHICLE AND METHOD THEREFOR

(71) Applicants: Hyundai Motor Company, Seoul (KR); Kia Corporation, Seoul (KR)

(72) Inventors: Dong Hoon Jeong, Hwaseong-si (KR); Byeong Wook Jeon, Seoul (KR); Yong Uk Shin, Seongnam-si (KR); Min Jae Chai, Gwangmyeong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/497,379

(22) Filed: Oct. 8, 2021

(30) Foreign Application Priority Data

Jun. 2, 2021 (KR) .......................... 10-2021-0071801

(51) Int. Cl.
| | | |
|---|---|---|
| *F16H 61/02* | (2006.01) | |
| *F16H 61/04* | (2006.01) | |
| *B60W 10/11* | (2012.01) | |
| *B60W 10/06* | (2006.01) | |
| *B60W 30/19* | (2012.01) | |

(52) U.S. Cl.
CPC ......... *F16H 61/0437* (2013.01); *B60W 10/06* (2013.01); *B60W 10/11* (2013.01); *B60W 30/19* (2013.01); *F16H 61/0213* (2013.01); *B60W 2510/0638* (2013.01); *B60W 2540/103* (2013.01); *F16H 2061/022* (2013.01); *F16H 2061/0216* (2013.01); *F16H 2061/0227* (2013.01)

(58) Field of Classification Search
CPC ............. F16H 61/0437; F16H 61/0213; F16H 61/662; F16H 2061/0216; F16H 2061/022; F16H 2061/0227; F16H 2061/66295; F16H 59/44; F16H 59/48; F16H 59/54; F16H 59/66; F16H 2059/605; F16H 2059/663; F16H 2059/704; B60W 10/06; B60W 10/11; B60W 30/19; B60W 2510/0638; B60W 2540/103
See application file for complete search history.

(56) References Cited

U.S. PATENT DOCUMENTS

| | | | |
|---|---|---|---|
| 2020/0318698 A1* | 10/2020 | Bosscher | ................ F16D 48/06 |
| 2022/0034400 A1* | 2/2022 | Miller | ...................... F16H 61/32 |
| 2022/0067023 A1* | 3/2022 | Serout | .................. G06F 21/552 |
| 2022/0080980 A1 | 3/2022 | Jeong et al. | |
| 2022/0178439 A1 | 6/2022 | Jeong et al. | |

FOREIGN PATENT DOCUMENTS

| | | |
|---|---|---|
| KR | 10-2022-0036200 A | 3/2022 |
| KR | 10-2022-0080574 A | 6/2022 |

* cited by examiner

*Primary Examiner* — Edwin A Young
(74) *Attorney, Agent, or Firm* — Morgan, Lewis & Bockius LLP

(57) ABSTRACT

An apparatus configured for controlling shift of a vehicle and a method therefore are provided. The apparatus include a storage storing a deep learning model, learning of which is completed; and a controller that predicts a vehicle speed and an accelerator position sensor (APS) value for each future time point according to the deep learning model, predicts a gear stage for each future time point using the predicted vehicle speed and the predicted APS value, and controls the shift of the vehicle based on the gear stage for each future time point, thus preventing a busy shift phenomenon and preventing an acceleration delay phenomenon.

14 Claims, 13 Drawing Sheets

APPARATUS FOR CONTROLLING SHIFT OF VEHICLE AND METHOD THEREFOR

CROSS-REFERENCE TO RELATED APPLICATION

The present application claims priority to Korean Patent Application No. 10-2021-0071801, filed on Jun. 2, 2021 the entire contents of which is incorporated herein for all purposes by this reference.

BACKGROUND OF THE INVENTION

Field of the Invention

The present invention relates to technologies of predicting a gear stage for each future time point and controlling upshift or downshift of a vehicle based on the predicted gear stage.

Description of Related Art

In general, a vehicle has a transmission which adjusts a driving speed of the vehicle using engine power. Such a transmission is classified as a manual transmission adjusted by a driver or an automatic transmission automatically adjusted according to a driving speed of the vehicle. The automatic transmission is provided between an output shaft of an internal combustion engine of the vehicle and an axle to automatically adjust a shift ratio depending on the amount of accelerator manipulation or a driving speed of the vehicle.

An existing technology of controlling shift of the vehicle controls the shift of the vehicle based on a shift pattern corresponding to a vehicle speed and the amount of accelerator pedal (an accelerator position sensor (APS) value). In the instant case, to prevent a busy shift phenomenon in which two gear stages are repeatedly shifted, the existing technology separately has an upshift pattern used to increase a speed stage and a downshift pattern used to decrease a gear stage.

When such an existing technology is applied to, for example, a six-stage transmission, it may have a default shift pattern (including five upshift patterns and five downshift patterns) and should further have dozens of shift patterns depending on a driving condition (e.g., a gradient, an altitude, a drive mode, or the like).

Thus, because the existing technology should have hundreds of upshift patterns and downshift patterns, there is a demand for a time taken to perform many tests and it is difficult to implement shift control logic.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus of controlling shift of a vehicle for predicting a vehicle speed and an accelerator position sensor (APS) value for each future time point based on a deep learning model, the learning of which is completed, predicting a gear stage for each future time point by receiving the predicted vehicle speed and the predicted APS value, and controlling the shift of the vehicle based on the predicted gear stage for each future time point to prevent a busy shift phenomenon and prevent an acceleration delay phenomenon by shift and a method therefor.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains. Furthermore, it may be easily seen that purposes and advantages of the present invention may be implemented by means indicated in claims and a combination thereof According to various aspects of the present invention, an apparatus of controlling shift of a vehicle may include a storage storing a deep learning model, learning of which is completed and a controller that predicts a vehicle speed and an accelerator position sensor (APS) value for each future time point according to the deep learning model, predicts a gear stage for each future time point using the predicted vehicle speed and the predicted APS value, and controls the shift of the vehicle based on the gear stage for each future time point.

In various exemplary embodiments of the present invention, the controller may maintain a current gear stage during a reference time, when a number of gear stages lower than a current gear stage among gear stages for every future time points is greater than a reference value, at an upshift time point of the current gear stage.

In various exemplary embodiments of the present invention, the controller may be configured to control downshift of a current gear stage, when a number of gear stages lower than a current gear stage among gear stages for every future time points is greater than a reference value, in a state where the current gear stage is maintained.

In various exemplary embodiments of the present invention, the controller may be configured to control the shifting to a gear stage lower than one stage from the current gear stage, when a change rate of the APS value is less than or equal to a threshold.

In various exemplary embodiments of the present invention, the controller may be configured to control the shifting to a gear stage lower than two stages from the current gear stage, when a change rate of the APS value is greater than a threshold.

In various exemplary embodiments of the present invention, the storage may store a power map in which a demand power corresponding to the vehicle speed and the APS value is recorded and an energy consumption map of a power source for each gear stage.

In various exemplary embodiments of the present invention, the controller may detect a current demand power according to the power map, may generate a power graph representing the demand power as revolutions per minute (RPM) and a torque of the power source for each gear stage, and may match the power graph with the energy consumption map of the power source to detect a gear stage which consumes minimum energy.

According to various aspects of the present invention, a method for controlling shift of a vehicle may include storing, by a storage, a deep learning model, learning of which is completed, predicting, by a controller, a vehicle speed and an accelerator position sensor (APS) value for each future time point according to the deep learning model, predicting, by the controller, a gear stage for each future time point using the predicted vehicle speed and the predicted APS value, and controlling, by the controller, the shift of the vehicle based on the gear stage for each future time point.

In various exemplary embodiments of the present invention, the controlling of the shift of the vehicle may include maintaining a current gear stage during a reference time, when a number of gear stages lower than a current gear stage among gear stages for every future time points is greater than a reference value, at an upshift time point of the current gear stage.

In various exemplary embodiments of the present invention, the controlling of the shift of the vehicle may include controlling downshift of a current gear stage, when a number of gear stages lower than a current gear stage among gear stages for every future time points is greater than a reference value, in a state where the current gear stage is maintained.

In various exemplary embodiments of the present invention, the controlling of the downshift of the current gear stage may include controlling shifting to a gear stage lower than one stage from the current gear stage, when a change rate of the APS value is less than or equal to a threshold.

In various exemplary embodiments of the present invention, the controlling of the downshift of the current gear stage may include controlling shifting to a gear stage lower than two stages from the current gear stage, when a change rate of the APS value is greater than a threshold.

In various exemplary embodiments of the present invention, the storing of the deep learning model may include storing a power map in which a demand power corresponding to the vehicle speed and the APS value is recorded and an energy consumption map of a power source for each gear stage.

In various exemplary embodiments of the present invention, the predicting of the gear stage for each future time point may include detecting a current demand power according to the power map, generating a power graph representing the demand power as revolutions per minute (RPM) and a torque of the power source for each gear stage, and matching the power graph with the energy consumption map of the power source to detect a gear stage which consumes minimum energy.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
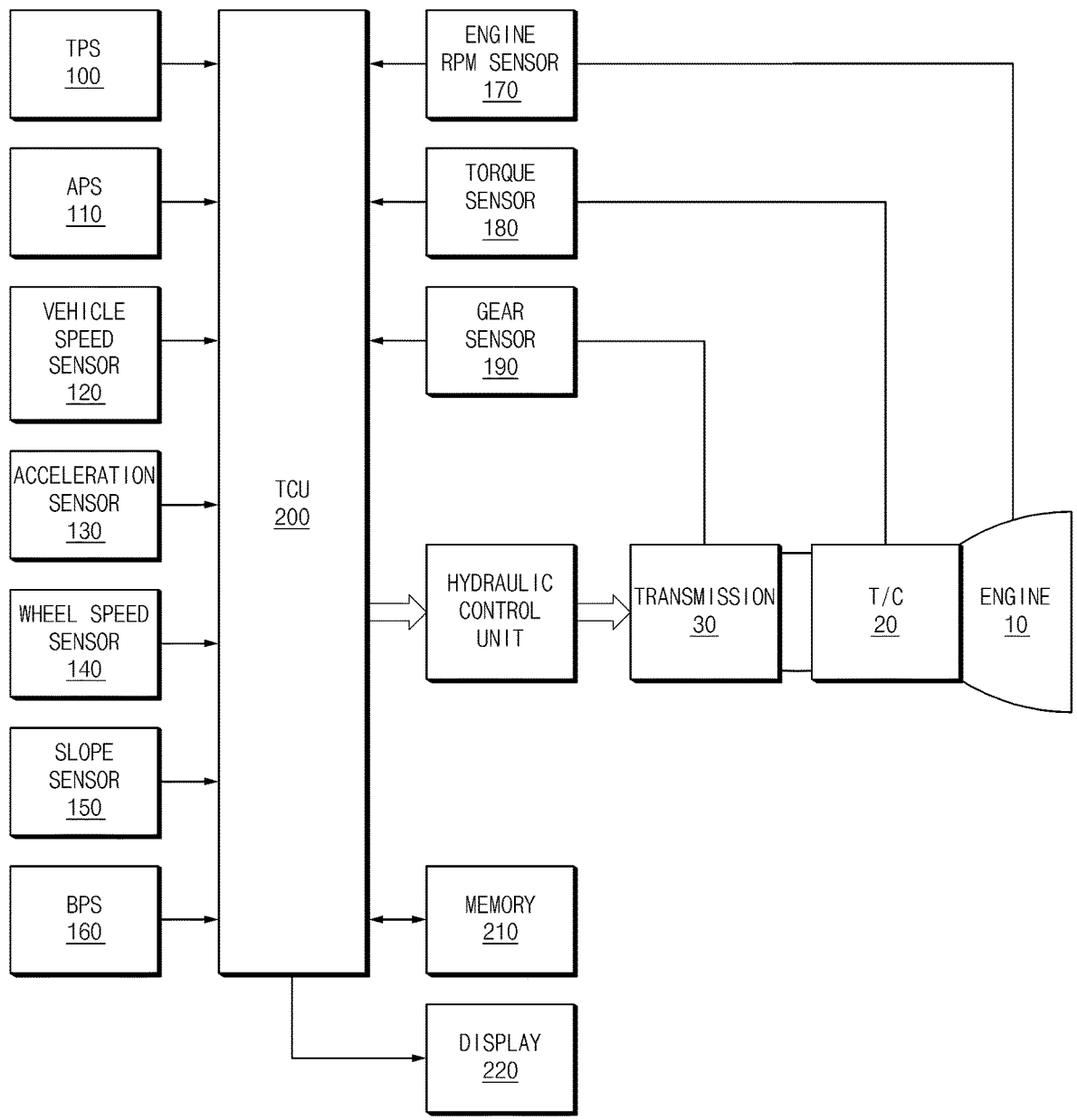
FIG. 1 is a block diagram illustrating a system for controlling shift of a vehicle to which embodiments of the present invention are applied.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a system for controlling shift of a vehicle to which embodiments of the present invention are applied, which illustrates that a power source is an engine 10. However, it is obvious that it is applicable in the same manner when the power source is a motor.

As shown in FIG. 1, the system for controlling the shift of the vehicle to which embodiments of the present invention are applied may include a throttle position sensor (TPS) 100, an accelerator position sensor (APS) 110, a vehicle speed sensor 120, an acceleration sensor 130, a wheel speed sensor 140, a slope sensor 150, a brake position sensor (BPS) 160, an engine revolutions per minute (RPM) sensor 170, a torque sensor 180, a gear sensor 190, a transmission control unit (TCU) 200, a memory 210, and a display 220.

Seeing the respective components, first of all, the TPS 100 may detect a throttle position according to an opening and closing amount of a throttle valve of an engine 10 to generate a throttle position sensing signal according to the throttle position. The APS 110 may detect an accelerator position according to a manipulation state of an accelerator pedal of a driver to generate an accelerator position sensing signal according to the accelerator position. The vehicle speed sensor 120 may detect a vehicle speed according to driving of the vehicle to generate a vehicle speed sensing signal according to the vehicle speed. The acceleration sensor 130 may detect a change in acceleration according to driving of the vehicle to generate an acceleration sensing signal according to the change in acceleration. The wheel speed sensor 140 may detect a wheel speed (a speed of a wheel) according to driving of the vehicle to generate a wheel speed sensing signal according to the wheel speed. The slope sensor 150 may detect a slope of a vehicle body according to hill driving of the vehicle to generate a slope sensing signal according to the slope of the vehicle body. The BPS 160 may detect a manipulation state of a brake pedal of the driver to generate a brake position sensing signal according to the manipulation state of the brake pedal. The engine RPM sensor 170 may detect a rotary RPM according to running of the engine 10 to generate an RPM sensing signal according to the rotation RPM. The torque sensor 180 may detect a rotational torque of a torque converter (T/C) 20 combined between the engine 10 and a transmission 30 to generate a torque sensing signal according to the rotational torque of the T/C 20. The gear sensor 190 may detect a manipulation state of a gear stage according to shift of the transmission 30 to generate a gear stage sensing signal according to the manipulation state of the gear stage.

Meanwhile, to control shift of the vehicle, the TCU 200 may receive the throttle position sensing signal from the TPS 100, the accelerator position sensing signal from the APS 110, the vehicle speed sensing signal from the vehicle speed sensor 120, the acceleration sensing signal from the acceleration sensor 130, the wheel speed sensing signal from the wheel speed sensor 140, the slope sensing signal from the slope sensor 150, the brake position sensing signal from the BPS 160, the RPM sensing signal from the engine RPM sensor 170, the torque sensing signal from the torque sensor 180, or the gear stage sensing signal from the gear sensor 190.

The TCU 200 may collect data for identifying a road state and a driving state of the vehicle by the sensing signal from each sensor and may analyze the collected data to classify information. In the instant case, driving information data analyzed by the collected data may include an opening and closing amount of the throttle valve, a position of an accelerator, a current gear engaging state of the transmission 30, a vehicle speed, acceleration, an engine RPM, an average vehicle speed, a difference in wheel RPM of a wheel, a slope of the vehicle, an operational period of a brake, a required amount of torque of the engine 10, or the like. The TCU 200 may perform gear up/down shift depending on a predetermined shift pattern (or shift line) based on the analyzed driving information data. The memory 210 may store a shift pattern by a manual shift command by the driver, a shift pattern by a shift protection command, a shift pattern of a class defined by shift of a class mode, or driving information data corresponding to the shift pattern of the class. The display 220 may display a shift progress state by applying a current shift pattern under control of the TCU 200 such that the driver may identify the shift progress state.

The above-mentioned system for controlling the shift of the vehicle may control the shift of the vehicle based on a shift pattern (in a general manner). When a manner according to various exemplary embodiments of the present invention is applied, which will be described below, the system for controlling the shift of the vehicle may control the shift of the vehicle in a demand power manner rather than the shift pattern manner.

Figure 2:
FIG. 2 is a block diagram illustrating a configuration of an apparatus of controlling shift of a vehicle according to various exemplary embodiments of the present invention.

FIG. 2 is a block diagram illustrating a configuration of an apparatus of controlling shift of a vehicle according to various exemplary embodiments of the present invention.

As shown in FIG. 2, the apparatus of controlling the shift of the vehicle according to various exemplary embodiments of the present invention may include a storage 21 and a controller 22. In the instant case, the respective components may be combined into one component and some components may be omitted, depending on a manner which executes the apparatus of controlling the shift of the vehicle according to various exemplary embodiments of the present invention.

Seeing the respective components, first of all, the storage 21 may be implemented as a memory 210 of FIG. 1 and may store various logics, algorithms, and programs required in a process of predicting a vehicle speed and an APS value for each future time point based on a deep learning model, the learning of which is completed, predicting a gear stage for each future time point by receiving the predicted vehicle speed and the predicted APS value, and controlling shift of the vehicle based on the predicted gear stage for each future time point.

Such a storage 21 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The controller 22 may perform the overall control such that respective components may normally perform their own functions. Such a controller 22 may be implemented in a form of hardware, may be implemented in a form of software, or may be implemented in a form of a combination thereof. The controller 22 may be implemented as, but not limited to, a microprocessor.

The controller 22 may perform a variety of control required in a process of predicting a vehicle speed and an APS value for each future time point based on a deep learning model, the learning of which is completed, predicting a gear stage for each future time point by receiving the predicted vehicle speed and the predicted APS value, and controlling shift of the vehicle based on the predicted gear stage for each future time point.

When the number of gear stages lower than a current gear stage among gear stages for every future time points is greater than a reference value (e.g., 2) at an upshift time point, the controller 22 may maintain the current gear stage during a reference time (e.g., one second) to prevent a busy shift phenomenon.

When the number of gear stages lower than the current gear stage among the gear stages for every future time points is greater than the reference value (e.g., 2) at a time point when the current gear stage is maintained, the controller 22 may control a transmission 30 of FIG. 1 to perform downshift, thus preventing an acceleration delay phenomenon by shift. In the instant case, the controller 22 may control shifting to a gear stage lower than one stage from the current gear stage, when a change rate of an APS value is less than or equal to a threshold, and may control shifting to a gear stages lower than two stages from the current gear stage, when the change rate of the APS value is greater than the threshold.

Hereinafter, the operation of the controller 22 will be described in detail with reference to FIG. 3 and FIG. 4.

Figure 3:
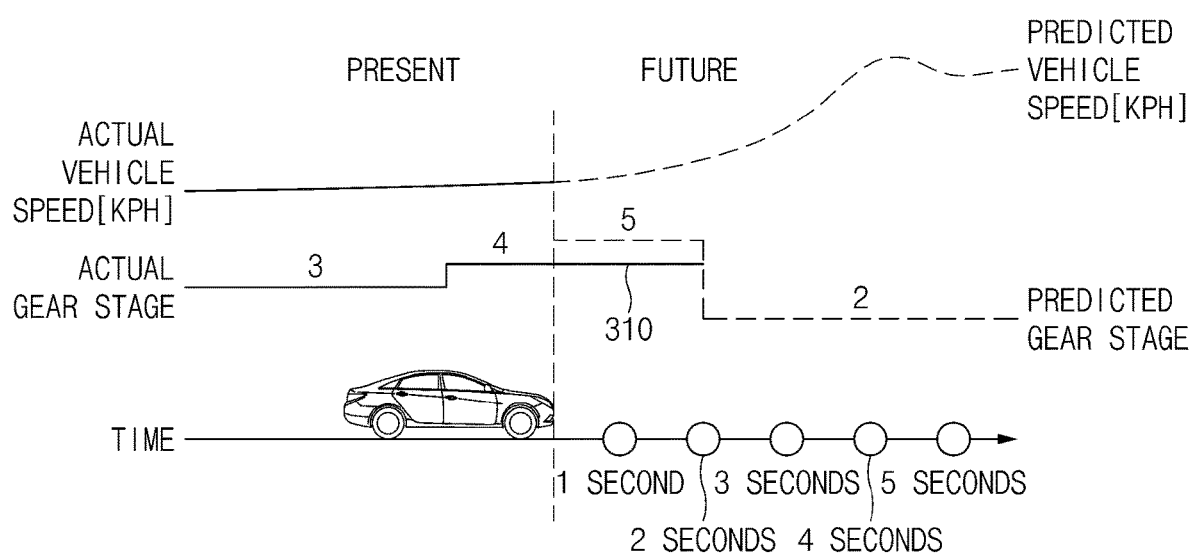
FIG. 3 is a drawing illustrating an operation of a controller provided in an apparatus of controlling shift of a vehicle according to various exemplary embodiments of the present invention.

FIG. 3 is a drawing illustrating an operation of a controller provided in an apparatus of controlling shift of a vehicle according to various exemplary embodiments of the present invention.

As shown in FIG. 3, for example, a controller 22 of FIG. 2 may predict a fifth stage as a gear stage after one second, may predict a second stage as a gear stage after two seconds, may predict the second stage as a gear stage after three seconds, may predict the second stage as a gear stage after four seconds, and may predict the second stage as a gear stage after five seconds, as gear stages for every future time points.

Although an upshift condition is met at a current time point, when the number of gear stages lower than the current gear stage (the fourth stage) among the predicted five gear stages is plural in number, the controller 22 may maintain the current gear stages for, for example, one second (see reference numeral 310). Thereafter, the controller 22 may predict a gear stage for each future time point again at a time point when one second has passed and may control shift of the vehicle based on the predicted gear stage.

Figure 4:
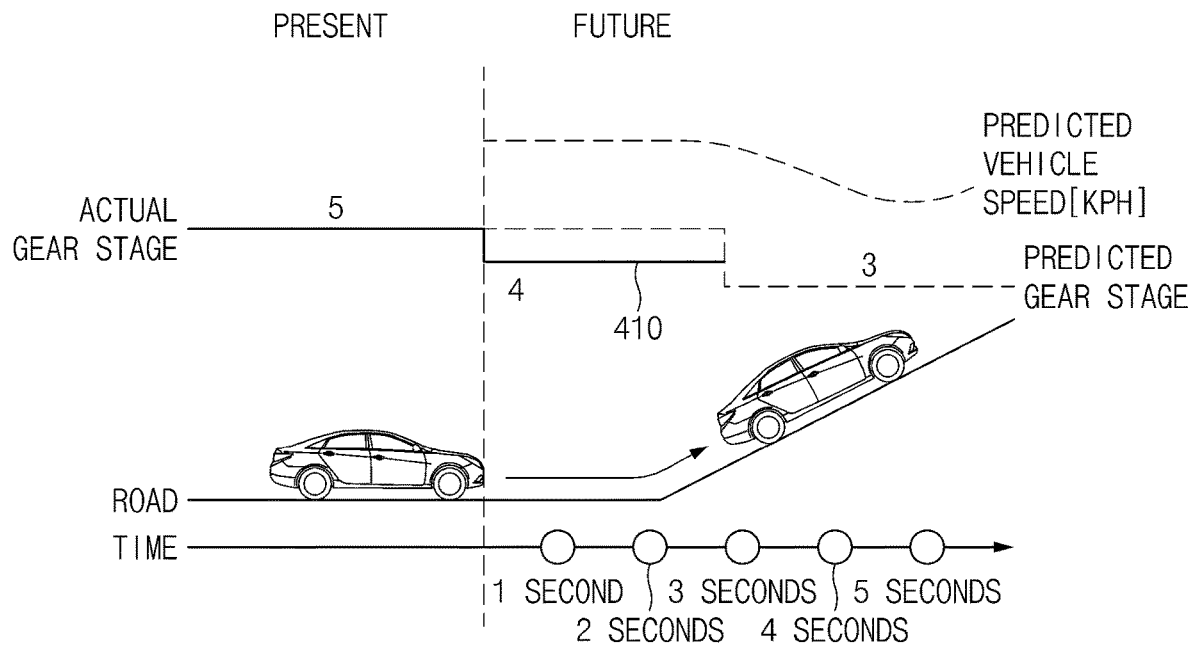
FIG. 4 is a drawing illustrating an operation of a controller provided in an apparatus of controlling shift of a vehicle according to various exemplary embodiments of the present invention.

FIG. 4 is a drawing illustrating an operation of a controller provided in an apparatus of controlling shift of a vehicle according to various exemplary embodiments of the present invention.

As shown in FIG. 4, for example, a controller 22 of FIG. 2 may predict a four stage as a gear stage after one second, may predict the fourth stage as a gear stage after two seconds, may predict a third stage as a gear stage after three seconds, may predict the third stage as a gear stage after four seconds, and may predict the third stage as a gear stage after five seconds, as gear stages for every future time points.

In a state where the current gear stage is maintained because the current gear stage is an optimal gear stage, when the number of gear stages lower than the current gear stage (the fifth stage) among the predicted five gear stages is plural in number, the controller 22 may control shift from the current gear stage to the fourth stage. In the instant case, when a change rate of the APS value is greater than a threshold, the controller 22 may control shifting to the third stage.

Figure 5A:
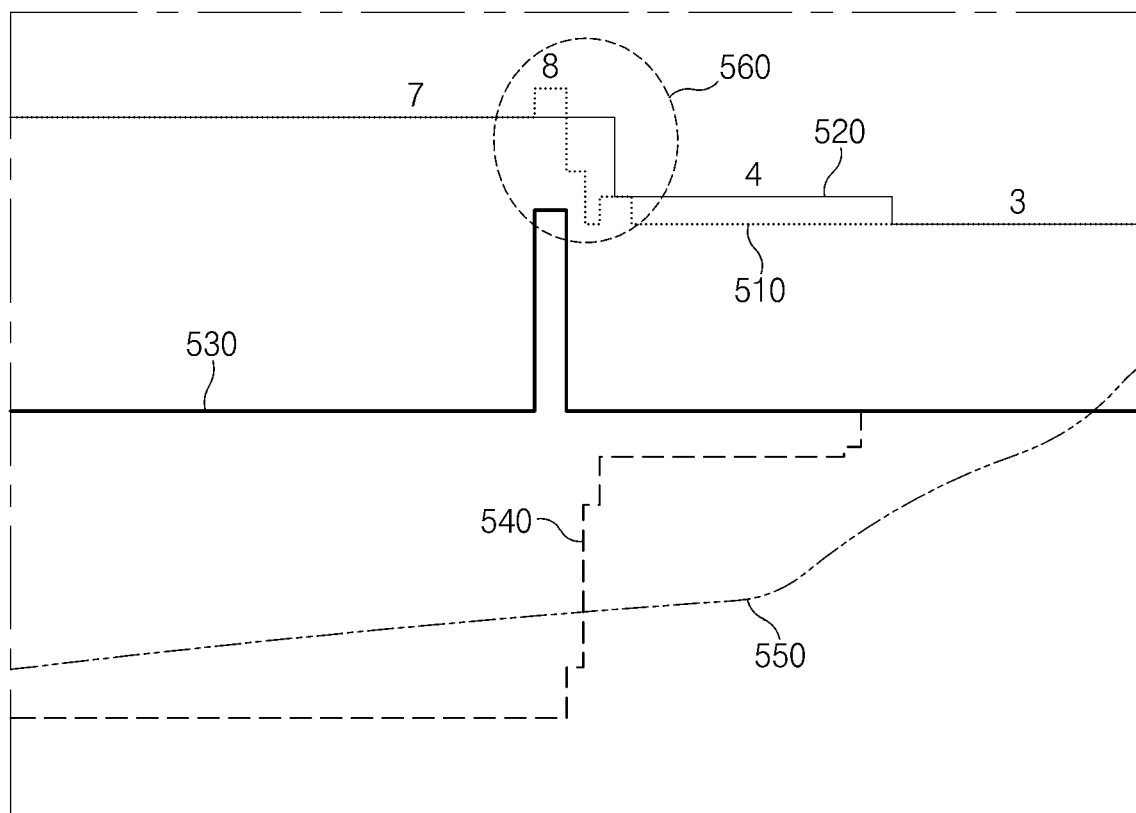
FIG. 5A is a drawing illustrating a first performance analysis of an apparatus of controlling shift of a vehicle according to various exemplary embodiments of the present invention.

FIG. 5A is a drawing illustrating a first performance analysis of an apparatus of controlling shift of a vehicle according to various exemplary embodiments of the present invention.

In FIG. 5A, reference numeral '510' indicates the real-time optimal gear stage, reference numeral '520' indicates the actual gear stage, reference numeral '530' indicates the activation flag of the predication-based shift control function, reference numeral '540' indicates the APS value, and reference numeral '550' indicates the vehicle speed.

As shown in FIG. 5A, at a time of having to shift from a seventh stage, which is the current gear stage, to an eighth stage which is the optimal gear stage, a controller 22 of FIG. 2 may maintain the current gear stage (the seventh stage) during one second without shifting to the eighth stage depending on predicting downshift of a future gear stage, thus identifying that the busy shift phenomenon is prevented (see reference numeral 560).

Figure 5B:
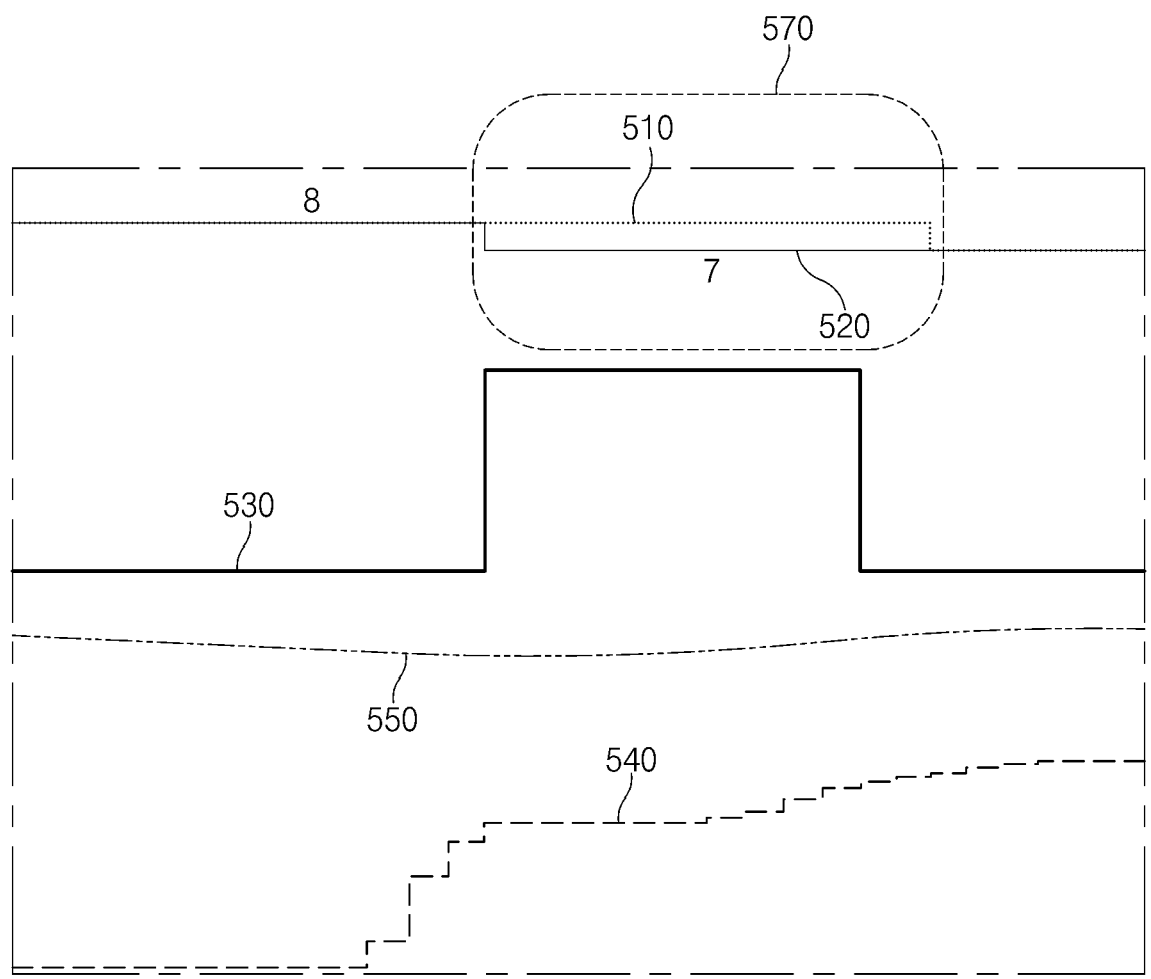
FIG. 5B is a drawing illustrating a second performance analysis of an apparatus of controlling shift of a vehicle according to various exemplary embodiments of the present invention.

FIG. 5B is a drawing illustrating a second performance analysis of an apparatus of controlling shift of a vehicle according to various exemplary embodiments of the present invention.

As shown in FIG. 5B, in a state where a current gear stage (an eighth stage) is maintained because the current gear stage is an optimal gear stage, a controller 22 of FIG. 2 may control shift from the eighth stage to a seventh stage early depending on predicting downshift of a future gear stage, thus identifying that the acceleration delay phenomenon by the shift is prevented (reference numeral 570).

Hereinafter, a description will be provided of a process where the controller 22 learns a deep learning model and predicts a vehicle speed and an APS value for each future time point according to the deep learning model, the learning of which is completed.

Figure 6:
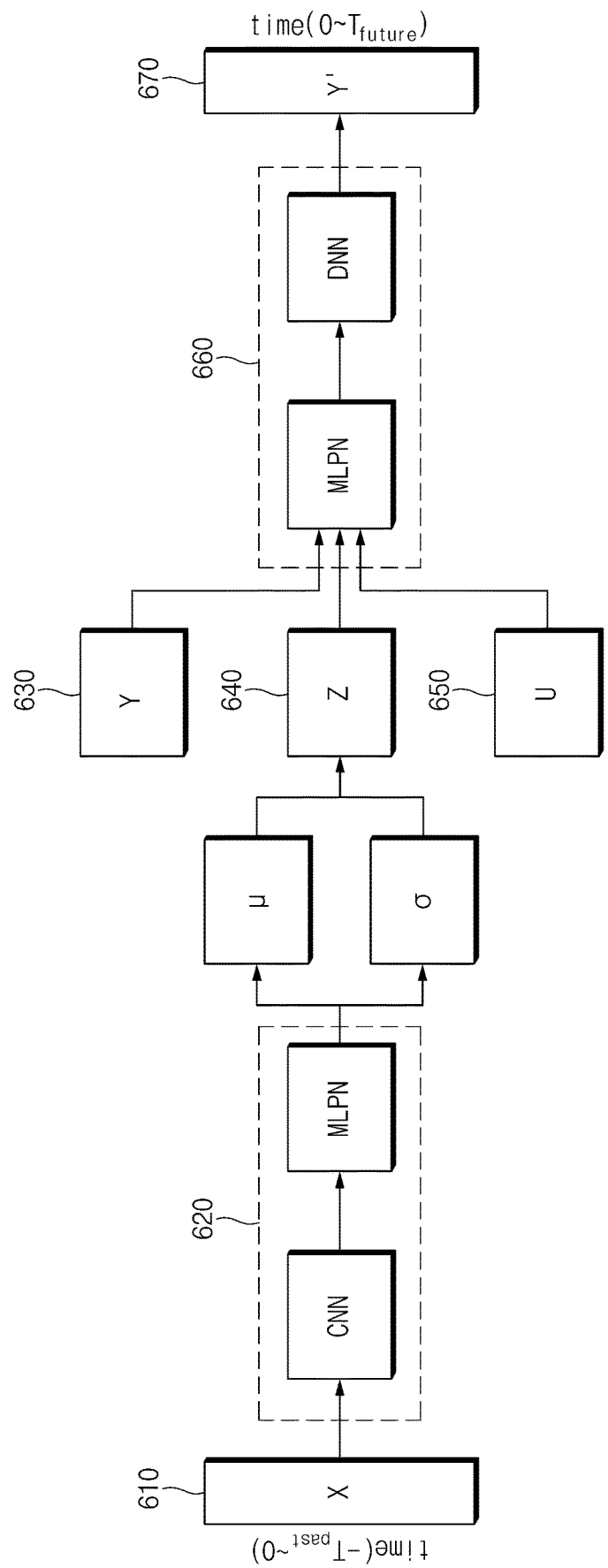
FIG. 6 is a drawing illustrating a deep learning model provided in an apparatus of controlling shift of a vehicle according to various exemplary embodiments of the present invention.

FIG. 6 is a drawing illustrating a deep learning model provided in an apparatus of controlling shift of a vehicle according to various exemplary embodiments of the present invention.

A controller 22 of FIG. 2 may input time series data 610 for a driving profile prior to a predicted time point to an encoder of a variational auto-encoder (VAE), may learn a deep learning model of predicting a speed and an APS value of a vehicle based on a low-dimensional variable Z, which is an output of the encoder 620, a vehicle speed and an APS value at the predicted time point, which are additionally input, and a driving profile at the predicted time, and may predict the speed and the APS value of the vehicle based on the deep learning model, the learning of which is completed.

Herein, the driving profile prior to the predicted time point is a value measured during a certain time prior to the current time point, which refers to information forming a driving pattern of the vehicle. Such a driving profile may include a gas pedal position (GPP) value, revolutions per minute (RPM), a gear stage, a vehicle speed, a gradient of the road, a curvature of the road, a steering angle, a brake pedal position (BPP) value (e.g., brake on/off or brake pressure), a separation distance from a preceding vehicle, a relative speed with the preceding vehicle, information related to traffic lights in front, an APS value, or the like. In the instant case, the driving profile is time series data measured during a certain time.

Furthermore, the driving profile at the predicted time point indicates a value measured at the current time point. In the instant case, the GPP value, the RPM, the gear stage, the vehicle speed, the steering angle, the BPP value, and the APS value may be obtained over a vehicle network. The gradient and the curvature of the road may be obtained from a navigation device provided in the vehicle. The relative distance from the preceding vehicle and the relative speed with the preceding vehicle may be obtained from a radar provided in the vehicle. The information related to the traffic lights in front (lighting information) may be obtained from a traffic light controller.

In a process of predicting the vehicle speed and the APS value based on the deep learning model, the learning of which is completed, the controller 22 may input time series data for a driving profile prior to the predicted time point to the encoder of the VAE, and may input the low-dimensional variable Z, which is the output of the encoder, the vehicle speed and the APS value at the predicted time point, and the driving profile at the predicted time point to a decoder of the VAE.

As shown in FIG. 6, the controller 22 may learn a VAE-based deep learning model of predicting a speed of the vehicle based on the low-dimensional variable Z, which is the output of the encoder, the vehicle speed and the APS value at the predicted time point, which are additionally input, and the driving profile at the predicted time point.

Reference numeral '620' indicates the probabilistic encoder, reference numeral '610' indicates the time series data X during the reference time ($T_{past}$~$T_{present}$) prior to the predicted time point ($T_{present}$), which is learning data for the driving profile, reference numeral '660' indicates the probabilistic decoder, reference numeral '640' indicates the low-dimensional variable Z which is the output of the encoder, reference numeral '630' indicates the vehicle speed and the APS value at the predicted time point, reference numeral '650' indicates the driving profile at the predicted time point, and reference numeral '670' indicates the predicted speed and the predicted APS value of the vehicle in the future. In the instant case, Y' may be the vehicle speed and the APS value during the reference time ($T_{present}$~$T_{future}$) from the current time point, which may be represented in a form of time series data. Furthermore, μ denotes the average of distribution, and σ denotes the variance of distribution.

The encoder 620 may have a convolutional neural network (CNN) and a multi layer perceptron network (MLPN). The decoder 660 may have a multi layer perceptron network (MLPN) and a deconvolutional neural network (DNN).

For reference, the decoder ($P\theta(x|z)$) may be parameterized by a deep neural network having a parameter θ. The decoder ($P\Phi(x|z)$) may be parameterized by a deep neural network having a parameter Φ. The low-dimensional variable z is defined to embed compression information of data X. The encoder 620 may map a data space to a potential space. The encoder 620 and the decoder 660 may be parameterized using a diagonal Gaussian distribution.

Hereinafter, a description will be provided of a process where the controller 22 predicts a gear stage for each future time point using the predicted vehicle speed and APS value for each future time point with reference to FIG. 7, FIG. 8, FIG. 9 and FIG. 10.

Figure 7:
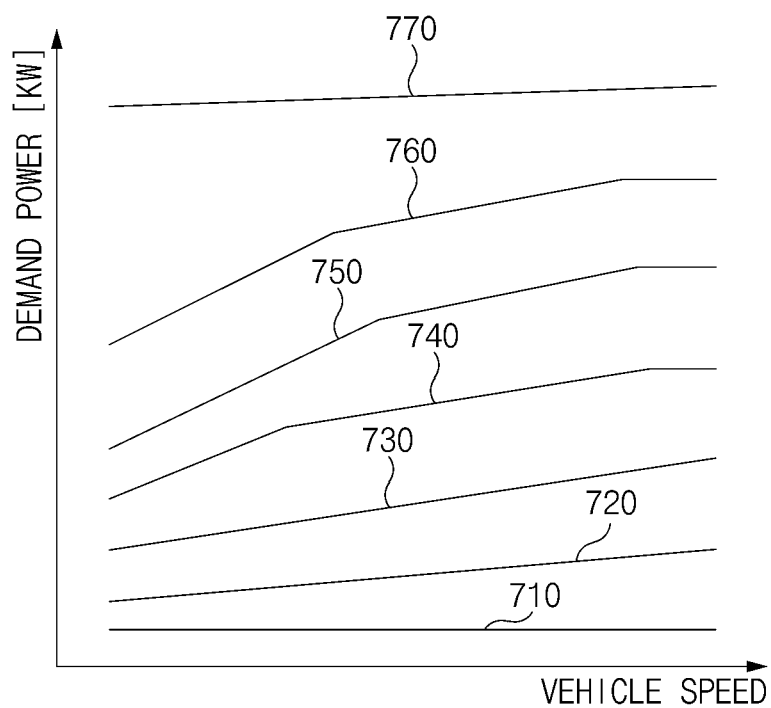
FIG. 7 is a drawing illustrating a power map stored in a storage provided in an apparatus of controlling shift of a vehicle according to various exemplary embodiments of the present invention.

FIG. 7 is a drawing illustrating a power map stored in a storage provided in an apparatus of controlling shift of a vehicle according to various exemplary embodiments of the present invention.

In FIG. 7, the horizontal axis indicates the vehicle speed kph and the vertical axis indicates the demand power kW. Reference numeral '710' is the graph illustrating the relationship between the vehicle speed and the demand power, when the output value of the APS 110 (hereinafter referred to as "APS value") is 5%. Reference numeral '720' is the graph illustrating the relationship between the vehicle speed and the demand power, when the APS value is 10%. Reference numeral '730' is the graph illustrating the relationship between the vehicle speed and the demand power, when the APS value is 20%. Reference numeral '740' is the graph illustrating the relationship between the vehicle speed and the demand power, when the APS value is 40%. Reference numeral '750' is the graph illustrating the relationship between the vehicle speed and the demand power, when the APS value is 60%. Reference numeral '760' is the graph illustrating the relationship between the vehicle speed and the demand power, when the APS value is 80%. Reference numeral '770' is the graph illustrating the relationship between the vehicle speed and the demand power, when the APS value is 100%.

The seven APS values are exemplified in FIG. 7. However, a graph illustrating the relationship between the vehicle speed and the demand power when the APS value is 30%, a graph illustrating the relationship between the vehicle speed and the demand power when the APS value is 50%, a graph illustrating the relationship between the vehicle speed and the demand power when the APS value is 70%, and a graph illustrating the relationship between the vehicle speed and the demand power when the APS value is 90% may be further included, or an intermediate value may be determined by determination (e.g., an interpolation method). For example, a controller 22 of FIG. 2 may identify the relationship between the vehicle speed and the demand power, when the APS value is 70%, using the graph 750 and the graph 760. For another example, the controller 22 may identify the relationship between the vehicle speed and the demand power, when the APS value is 75%, using the graph 750 and the graph 760.

Figure 8:
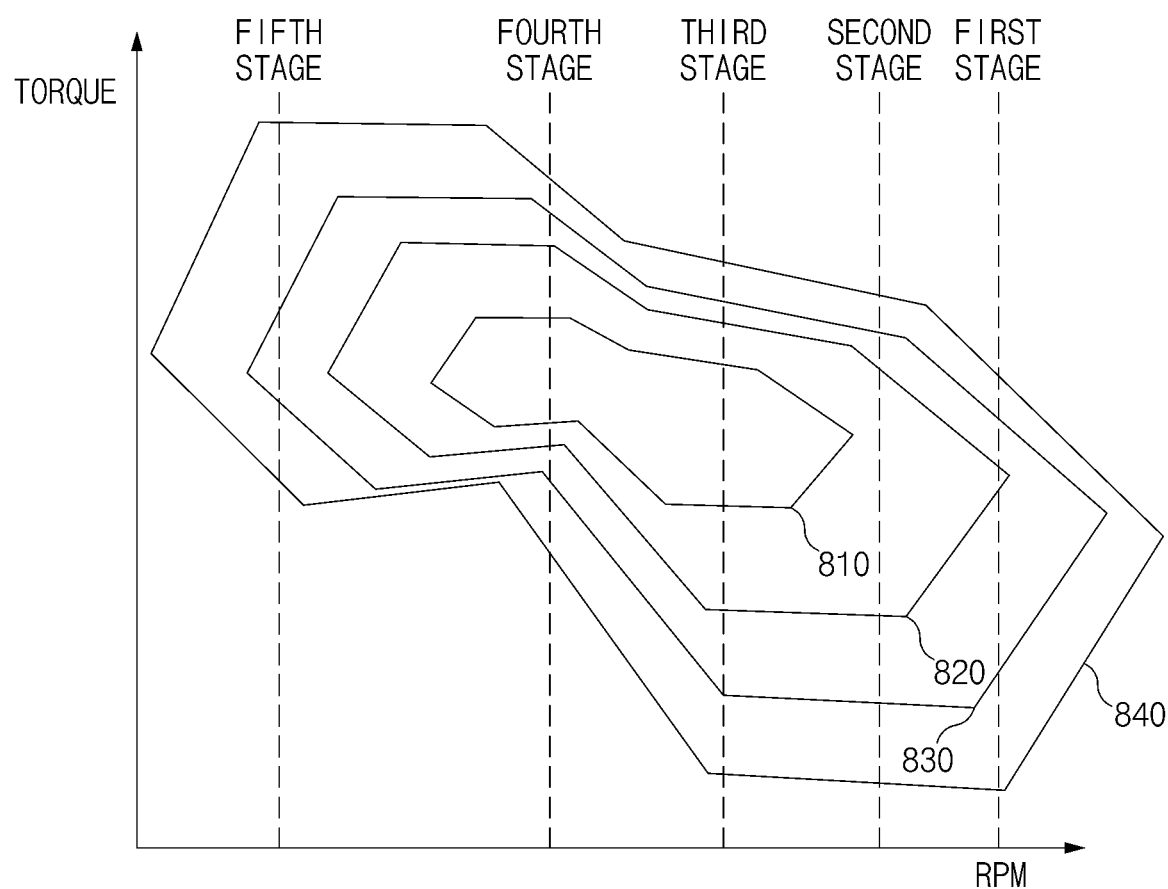
FIG. 8 is a drawing illustrating an energy consumption map of a power source stored in a storage provided in an apparatus of controlling shift of a vehicle according to various exemplary embodiments of the present invention.

FIG. 8 is a drawing illustrating an energy consumption map of a power source stored in a storage provided in an apparatus of controlling shift of a vehicle according to various exemplary embodiments of the present invention.

In FIG. 8, the horizontal axis indicates the RPM of the power source and the vertical axis indicates the torque of the power source. Reference numeral '810' is the graph illustrating energy (e.g., 330 kJ/s) consumed in the third stage and the fourth stage according to the RPM and torque of the power source. Reference numeral '820' is the graph illustrating energy (e.g., 340 kJ/s) consumed in the first stage, the second stage, the third stage, and the fourth stage according to the RPM and torque of the power source. Reference numeral '830' is the graph illustrating energy (e.g., 350 kJ/s) consumed in all stages according to the RPM and torque of the power source. Reference numeral '840' is the graph illustrating energy (e.g., 360 kJ/s) consumed in all stages according to the RPM and torque of the power source. Such an energy consumption map of the power source for each gear stage may vary with a type and performance of the power source.

A controller 22 of FIG. 2 may detect a demand power corresponding to a vehicle speed and an APS value based on the power map stored in a storage 21 of FIG. 2, may generate a graph representing the detected demand power as an RPM and a torque of the power source for each gear stage, and may match the generated graph with an energy consumption map of the power source stored in the storage 21 to control shifting to a gear stage which consumes minimum energy.

Figure 9:
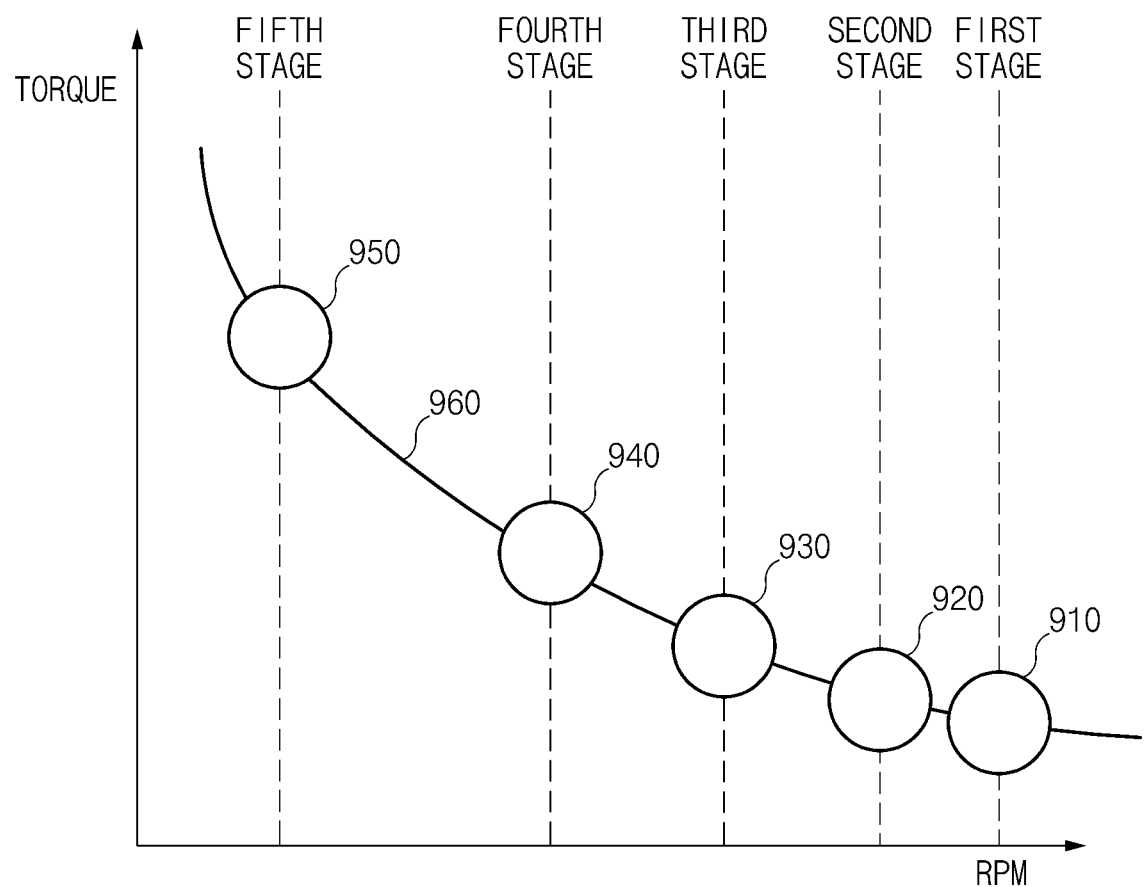
FIG. 9 is a drawing illustrating a power graph generated by a controller provided in an apparatus of controlling shift of a vehicle according to various exemplary embodiments of the present invention.

FIG. 9 is a drawing illustrating a power graph generated by a controller provided in an apparatus of controlling shift of a vehicle according to various exemplary embodiments of the present invention.

A controller 22 of FIG. 2 may generate a power graph representing a demand power (e.g., 100 kW) as an RPM and a torque of a power source for each gear stage.

In FIG. 9, the horizontal axis indicates the RPM of the power source and the vertical axis indicates the torque of the power source. Reference numeral '910' is the point representing the demand power of 100 kW as the torque and the RPM in the first stage. Reference numeral '920' is the point representing the demand power of 100 kW as the torque and the RPM in the second stage. Reference numeral '930' is the point representing the demand power of 100 kW as the torque and the RPM in the third stage. Reference numeral '940' is the point representing the demand power of 100 kW as the torque and the RPM in the fourth stage. Reference numeral '950' is the point representing the demand power of 100 kW as the torque and the RPM in the fifth stage. In the instant case, a line connecting the points 910 to 950 is referred to as a power graph 960.

Figure 10:
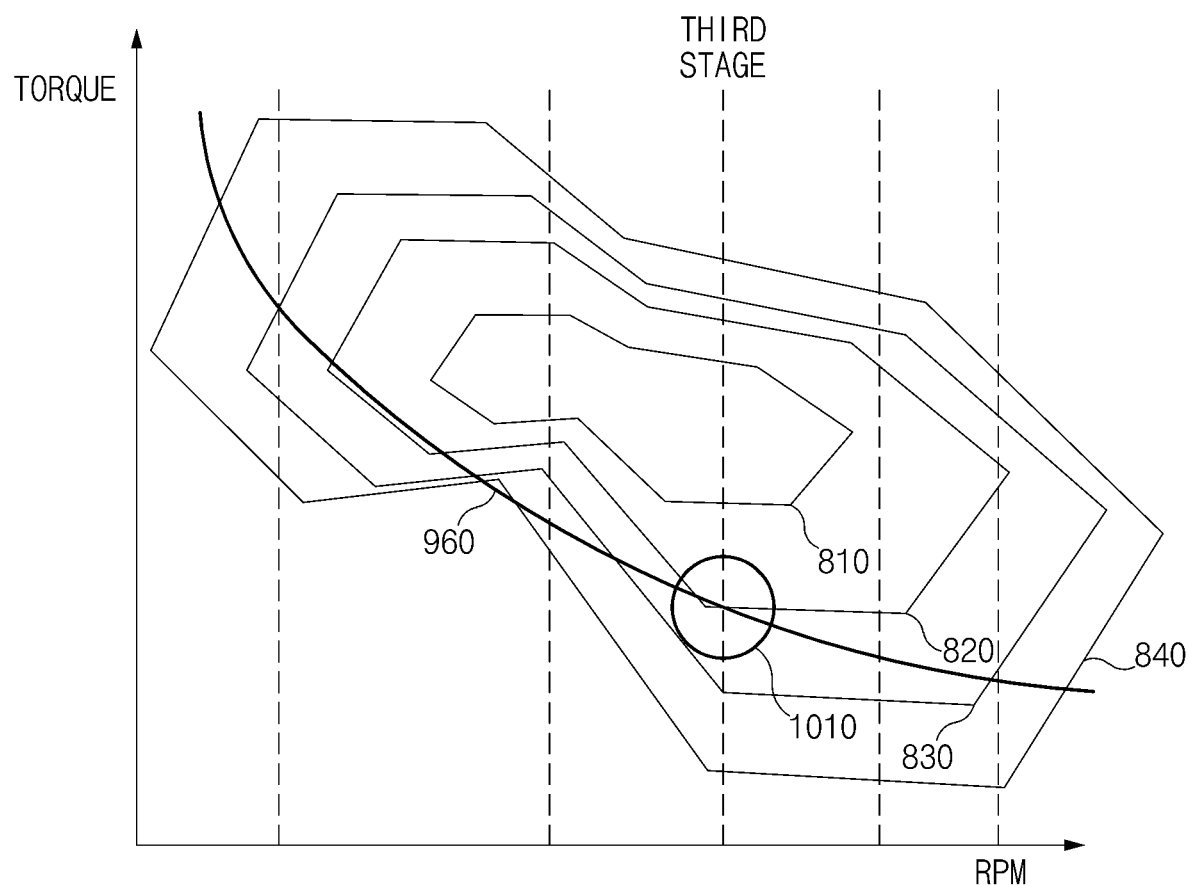
FIG. 10 is a drawing illustrating a process of detecting a gear stage which consumes minimum energy in a controller provided in an apparatus of controlling shift of a vehicle according to various exemplary embodiments of the present invention.

As shown in FIG. 10, the controller 22 may match the graph shown in FIG. 9 with an energy consumption map of the power source stored in a storage 21 of FIG. 2 to detect a gear stage which consumes minimum energy.

FIG. 10 is a drawing illustrating a process of detecting a gear stage which consumes minimum energy in a controller provided in an apparatus of controlling shift of a vehicle according to various exemplary embodiments of the present invention.

As described with reference to FIG. 8, energy is low in an order of the first energy graph 810, the second energy graph 820, the third energy graph 830, and the fourth energy graph 840 (in an order of graphs indicating low energy). A controller 22 of FIG. 2 may determine whether the first energy graph 810 having the lowest energy is overlapped with a power graph 960. When there is the overlapped energy graph, the controller 22 may determine whether the energy graph is overlapped in any gear stage.

Seeing it with reference to FIG. 10, as the first energy graph 810 is not overlapped with the power graph 960, the controller 22 may not detect a gear stage in conjunction with the first energy graph 810.

It may be seen that the second energy graph 820 having the next lowest energy is accurately overlapped with the power graph 960 in the third stage (see reference numeral 1010). Thus, the controller 22 may detect the third stage as a gear stage which consumes minimum energy.

In such a manner, the controller 22 may predict an optimal transmission stage per future time point using a vehicle speed and an APS value predicted at a corresponding time point per future time point (e.g., one second, two seconds, three seconds, four seconds, or five seconds in the future).

Furthermore, because the third energy graph 830 is overlapped with the power graph 960 in the fifth stage, but is higher in energy than the second energy graph 820, the controller 22 may not select the fifth stage as a gear stage.

Figure 11:
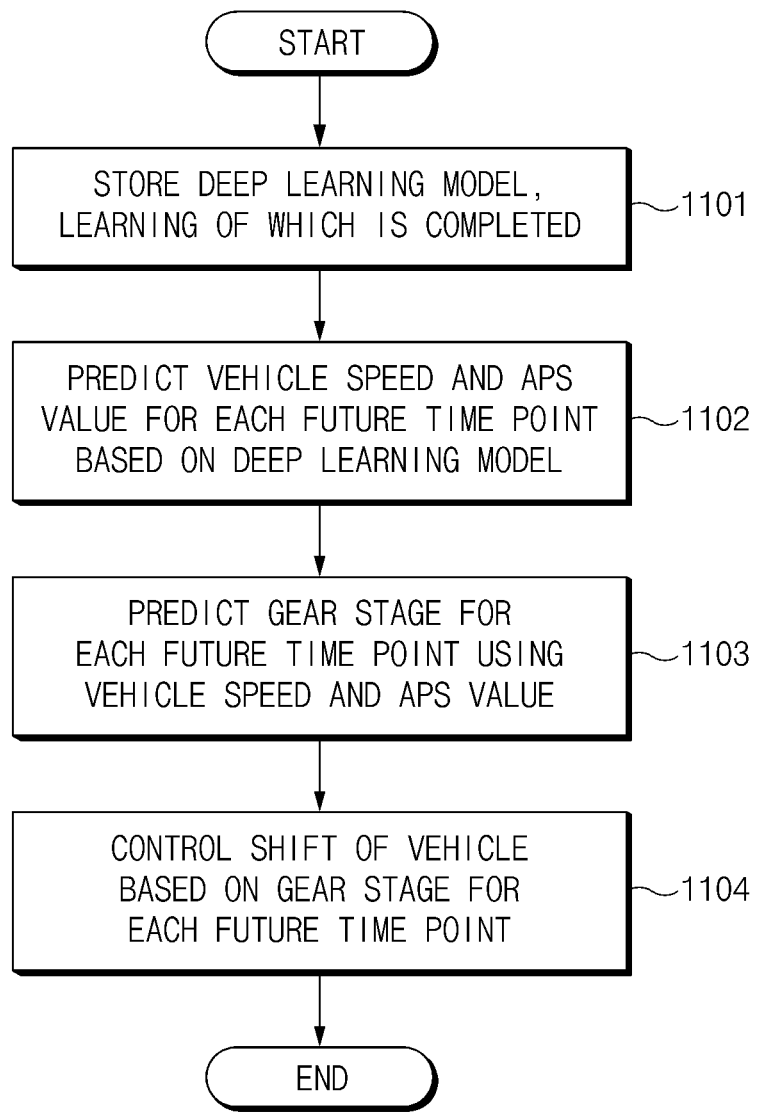
FIG. 11 is a flowchart illustrating a method for controlling shift of a vehicle according to various exemplary embodiments of the present invention.

FIG. 11 is a flowchart illustrating a method for controlling shift of a vehicle according to various exemplary embodiments of the present invention.

First of all, in operation 1101, a storage 21 of FIG. 2 may store a deep learning model, the learning of which is completed.

In operation 1102, a controller 22 of FIG. 2 may predict a vehicle speed and an APS value for each future time point based on the deep learning model.

In operation 1103, the controller 22 may predict a gear stage for each future time point using the vehicle speed and the APS value.

In operation 1104, the controller 22 may control shift of the vehicle based on the gear stage for each future time point.

Figure 12:
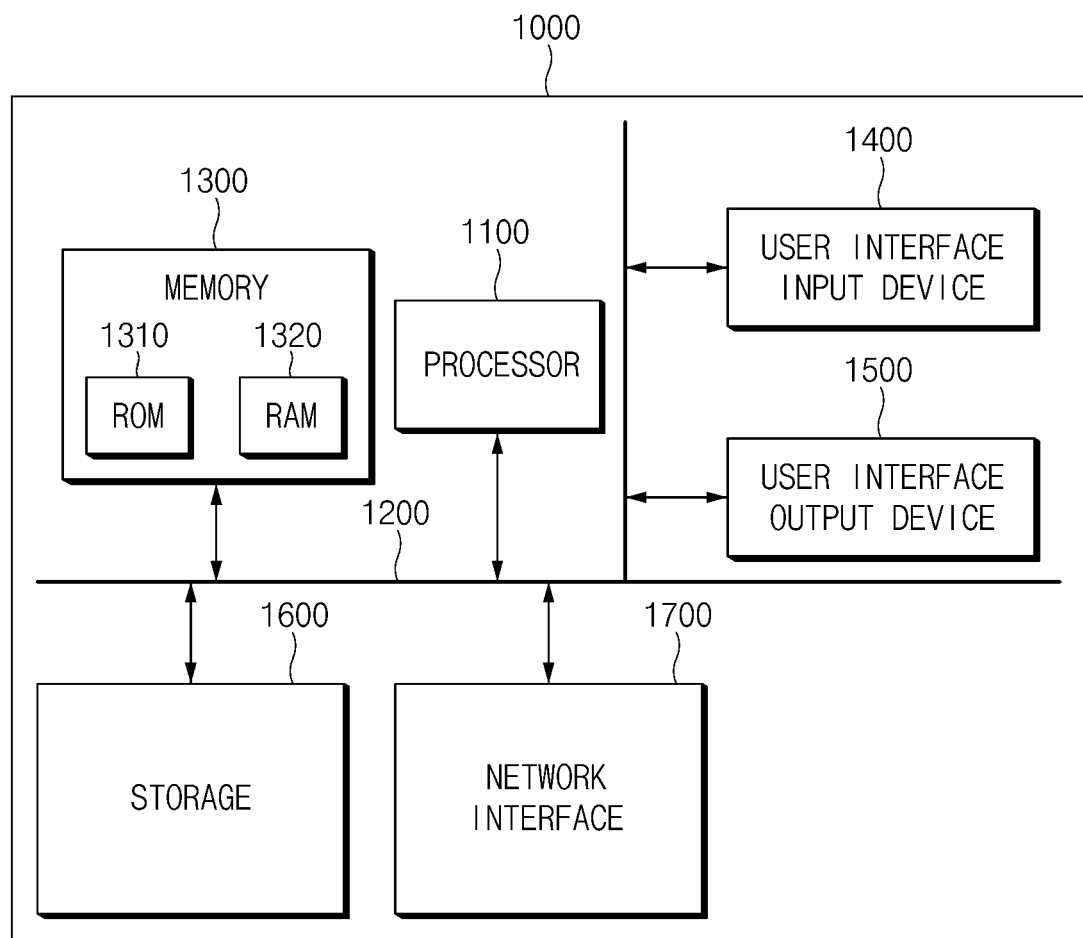
FIG. 12 is a block diagram illustrating a computing system for executing a method for controlling shift of a vehicle according to various exemplary embodiments of the present invention.

FIG. 12 is a block diagram illustrating a computing system for executing a method for controlling shift of a vehicle according to various exemplary embodiments of the present invention.

Referring to FIG. 12, the above-mentioned method for controlling the shift of the vehicle according to various exemplary embodiments of the present invention may be implemented by the computing system. A computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a Random Access Memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a SSD (Solid State Drive), a removable disk, and a CD-ROM. The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The apparatus of controlling the shift of the vehicle and the method therefore according to various exemplary embodiments of the present invention are provided to predict a vehicle speed and an accelerator position sensor (APS) value for each future time point based on a deep learning model, the learning of which is completed, predict a gear stage for each future time point by receiving the predicted vehicle speed and the predicted APS value, and control the shift of the vehicle based on the predicted gear stage for each future time point, thus preventing a busy shift phenomenon and preventing an acceleration delay phenomenon by shift.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling shifting of a vehicle, the apparatus comprising:
    a storage storing a deep learning model, learning of which is completed; and
    a controller configured to:
        predict a vehicle speed and an accelerator position sensor (APS) value for each future time point according to the deep learning model,
        predict a gear stage for each future time point using the predicted vehicle speed and the predicted APS value, and
        control the shifting of the vehicle according to the predicted gear stage for each future time point.

2. The apparatus of claim 1, wherein the controller is configured to maintain a current gear stage during a reference time, when a number of gear stages lower than a current gear stage among gear stages for every future time points is greater than a reference value, at an upshift time point of the current gear stage.

3. The apparatus of claim 1, wherein the controller is configured to control downshift of a current gear stage, when a number of gear stages lower than a current gear stage among gear stages for every future time points is greater than a reference value, in a state where the current gear stage is maintained.

4. The apparatus of claim 3, wherein the controller is configured to control the shifting to a gear stage lower than one stage from the current gear stage, when a change rate of the APS value is less than or equal to a threshold.

5. The apparatus of claim 3, wherein the controller is configured to control the shifting to a gear stage lower than two stages from the current gear stage, when a change rate of the APS value is greater than a threshold.

6. The apparatus of claim 1, wherein the storage stores a power map in which a demand power corresponding to the vehicle speed and the APS value is recorded and an energy consumption map of a power source for each gear stage.

7. The apparatus of claim 6, wherein the controller is configured to detect a current demand power according to the power map, to generates a power graph representing the demand power as revolutions per minute (RPM) and a torque of the power source for each gear stage, and to match the power graph with the energy consumption map of the power source to detect a gear stage which consumes minimum energy.

8. A method for controlling shifting of a vehicle, the method comprising:
    storing, by a storage, a deep learning model, learning of which is completed;
    predicting, by a controller, a vehicle speed and an accelerator position sensor (APS) value for each future time point according to the deep learning model;
    predicting, by the controller, a gear stage for each future time point using the predicted vehicle speed and the predicted APS value; and
    controlling, by the controller, the shifting of the vehicle according to the predicted gear stage for each future time point.

9. The method of claim 8, wherein the controlling of the shifting of the vehicle includes:
    maintaining a current gear stage during a reference time, when a number of gear stages lower than a current gear stage among gear stages for every future time points is greater than a reference value, at an upshift time point of the current gear stage.

10. The method of claim 8, wherein the controlling of the shifting of the vehicle includes:
    controlling downshift of a current gear stage, when a number of gear stages lower than a current gear stage among gear stages for every future time points is greater than a reference value, in a state where the current gear stage is maintained.

11. The method of claim 10, wherein the controlling of the downshift of the current gear stage includes:
    controlling the shifting to a gear stage lower than one stage from the current gear stage, when a change rate of the APS value is less than or equal to a threshold.

12. The method of claim 10, wherein the controlling of the downshift of the current gear stage includes:
    controlling the shifting to a gear stage lower than two stages from the current gear stage, when a change rate of the APS value is greater than a threshold.

13. The method of claim 8, wherein the storing of the deep learning model includes:
    storing a power map in which a demand power corresponding to the vehicle speed and the APS value is recorded and an energy consumption map of a power source for each gear stage.

14. The method of claim 13, wherein the predicting of the gear stage for each future time point includes:
    detecting a current demand power according to the power map;
    generating a power graph representing the demand power as revolutions per minute (RPM) and a torque of the power source for each gear stage; and matching the power graph with the energy consumption map of the power source to detect a gear stage which consumes minimum energy.

* * * * *